Figure 1:
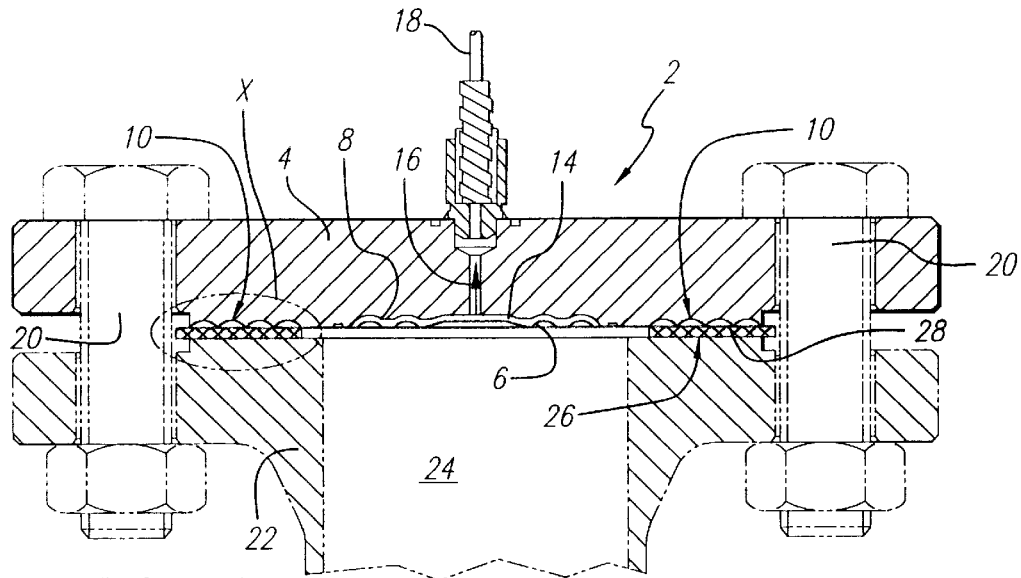

United States Patent [19]
Heller

[11] Patent Number: 5,983,726
[45] Date of Patent: Nov. 16, 1999

[54] PROCESS FOR THE PRODUCTION OF AN ASSEMBLY OF A MEMBRANE PRESSURE SENSOR AND A MEMBRANE PRESSURE SENSOR

[75] Inventor: Heinz Heller, Walldürn-Rippberg, Germany

[73] Assignee: WIKA Alexander Wiegand GmbH & Co., Klingenberg, Germany

[21] Appl. No.: 08/994,523

[22] Filed: Dec. 19, 1997

[51] Int. Cl.[6] ..................................................... G01L 11/00
[52] U.S. Cl. ............................................................ 73/706
[58] Field of Search .............................. 73/706, 715, 716, 73/717, 719, 720, 721, 727, 756; 600/486, 488

[56] References Cited

U.S. PATENT DOCUMENTS

| | | | |
|---|---|---|---|
| 5,070,735 | 12/1991 | Reichert et al. | 73/727 |
| 5,752,918 | 5/1998 | Fowler et al. | 73/706 |
| 5,824,909 | 10/1998 | Kathan et al. | 73/706 |

*Primary Examiner*—William Oen
*Attorney, Agent, or Firm*—Roth & Goldman

[57] ABSTRACT

A membrane pressure sensor has an assembly comprising a thin membrane and a base, on which an annular joining face is formed. The membrane has a waved edge region in which numerous annular wave troughs and wave crests succeed one another alternatingly in the radial direction. The waved edge region of the membrane is attached to the joining face of the base. The wave crests of the edge region form numerous annular protrusions on the side turned away from the joining face, which permit a high sealing action when the assembly is connected with an annular flange having a measurement material space. When the joining face is flat, at least all wave troughs of the waved edge region of the membrane are circumferentially soldered to the joining face. When the joining face is provided with grooves complementary to the waves of the edge region, at least all wave crests of the waved edge region are soldered to the joining face and the waves of the edge region are stamped by pressing the initially flat edge region of a membrane blank against the grooved joining face such that this serves as a die during the stamping process.

28 Claims, 1 Drawing Sheet

PROCESS FOR THE PRODUCTION OF AN ASSEMBLY OF A MEMBRANE PRESSURE SENSOR AND A MEMBRANE PRESSURE SENSOR

DESCRIPTION

The invention concerns a process for the production of an assembly of a membrane pressure sensor as well as a membrane pressure sensor.

Membrane pressure sensors are known. A membrane pressure sensor is used to transmit a pressure of a measurement substance to be measured to a pressure gage, when this gage should, for specific reasons, not come directly into contact with the substance to be measured, for example, because the substance to be measured is corrosive or highly viscous.

A membrane pressure sensor which has an assembly which consists of a thin membrane made of metal as well as a base made of metal is known. The membrane has a waved central region and an annular edge region surrounding the central region. On its side facing the central region, the base has a shallow recess with a bottom which has a waved surface which complements the waves of the central region of the membrane and forms a membrane bed. Surrounding the recess, the base also has an annular joining face onto which the edge region of the membrane is attached. The edge region of the membrane is waved such that a large number of annular wave troughs and wave crests succeed one another alternatingly in the radial direction of the membrane, such that the wave crests form annular protrusions on the side of the edge region turned away from the joining face.

In the prior art membrane pressure sensor, the walls of the recess and the membrane bound a pressure sensor space which is filled with a suitable filling fluid. The pressure sensor space is connected via a line with the pressure gage such that the pressure of the filling fluid in the pressure sensor space is measured and possibly displayed by means of the pressure gage.

In operation the assembly of the membrane pressure sensor is connected with a flange, which has an annular opposing sealing face, which lies directly, or indirectly with the intermediary of a sealing ring, on the edge region of its side facing away from the joining face. A measurement substance space, which is adjacent the membrane on the side of the membrane facing away from the measurement substance space and which is filled in operation with the substance to be measured, is formed the flange. By deflection of the membrane, the pressure of the substance to be measured is transmitted to the filling fluid in the pressure sensing space.

The seal between the opposing sealing face of the flange and the edge region of the membrane must be reliable so that the substance to be measured cannot escape between the assembly and the flange from the measurement substance space. It has been demonstrated that the annular protrusions formed by the wave crests of the waved edge region of the membrane permit a very good seal of the measurement substance space such that the prior art membrane pressure sensor is particularly well-suited for aggressive measurement substances.

In the process of the production of the prior art membrane pressure sensor, the joining face is formed on the base as a grooved surface with a large number of grooves concentric to each other, which are directly adjacent to each other such that the transition between two adjacent grooves is formed by a crest. These grooves have a small width of less than 1 mm and a depth of 0.2 mm, for example. Also, in the process of production, an flat membrane blank is produced, usually by punching from a metal sheet. The edge region of the membrane blank is plastically deformed by means of a stamping tool which has a die and a stamp such that the wave troughs and wave crests of the edge region of the membrane are stamped.

The goal is that the stamped wave troughs and crests have a shape which complements the grooves of the joining face. The waved central region of the membrane may be stamped at the same time as the edge region or at a different time. The membrane is then placed with its stamped edge region on the grooved joining face and attached to the joining face using two circumferential welding seams. One of these two welding seams runs on the radially inward edge of the stamped edge region of the membrane, and the other one of the two welding seams runs on the radially outward edge of the stamped edge region of the membrane.

Although the prior art membrane pressure sensor produced in the manner explained above basically has the advantage that the annular protrusions formed by the wave crests of the stamped edge region can ensure high seal integrity, disadvantages of the prior art membrane pressure sensor have, on the other hand, also been demonstrated. The welding seams have only limited strength and corrosion resistance. The corrosion resistance is reduced in particular when the material of the membrane and the material of the base are different from each other such that the welding seams are materially inhomogeneous. The limited strength and limited corrosion resistance of the welding seams may also result in the fact that they become leaky and that filling fluid "creeps" between the joining face and the stamped edge region of the membrane. This results in measurement and/or display errors. It may also happen that in disassembly of the assembly from the flange, the stamped edge region adheres so strongly to the opposing sealing face or to the sealing ring that the entire assembly becomes unusable. And finally, the process for production of the prior art membrane pressure sensor does not ensure that the grooves of the joining face and the waves of the edge region of the membrane are actually complementary to each other. This may result in the fact that the annular protrusions deviate from their desired shape and their sealing action is consequently reduced.

From the publication EP-A1-0 655 615, a membrane pressure sensor is known, whereby the edge region of the membrane is completely welded with its whole face to the joining face of the base. This ensures a strong and leakproof connection between the edge region of the membrane and of the joining face. The joining face and the edge region of the membrane are, however, flat, and the particularly high sealing action which is obtained in the membrane pressure sensor described in the introduction through the annular protrusions of the edge region of the membrane cannot be obtained with the membrane pressure sensor according to EP-A1-0 655 615.

The object of the invention is to avoid the above-explained disadvantages.

One object of the invention consists in providing a process for production of an assembly of a membrane pressure sensor which permits high shape accuracy of the annular protrusions and thus an effective sealing of the measurement substance space.

Another object of the invention consists in providing a process for production of an assembly of a membrane pressure sensor which permits a strong and leakproof connection between the joining face and the stamped edge region of the membrane such that the filling fluid cannot creep between the joining face and the stamped edge region of the membrane and such that the tearing of the membrane from the base is prevented.

An additional object of the invention consists in providing a membrane pressure sensor whereby the connection between the stamped edge region of the membrane and the joining face meets the particularly high requirements with respect to fluid seal integrity and mechanical strength.

The invention also has the object of providing a membrane pressure sensor whereby the annular protrusions of the edge region have high shape accuracy such that a particularly effective seal of the measurement substance space is ensured.

According to a first aspect of the invention, provision is made that the process for production of an assembly of a membrane pressure sensor comprises the steps, a) that the joining face on the base is formed as a grooved surface with a large number of grooves concentric to each other, which grooves are directly adjacent to each other, such that the transition between two adjacent grooves is formed by a crest, b) that a membrane blank with a flat edge region is produced, c) that the flat edge region of the membrane blank is placed on the grooved joining face and pressure is applied by a tool such that the edge region of the membrane blank is plastically deformed and thus the wave troughs and crests of the edge region of the membrane are stamped with a shape complementary to the grooves and crests of the joining face, d) that, next, the membrane is separated from the base, e) that a solder paste is applied to the entire grooved joining face, f) that the membrane with its stamped edge region is placed on the joining face provided with the solder paste, and g) that the stamped edge region is soldered to the grooved joining face through the application of heat.

In the process according to this first aspect of the invention, the full-surface solder between the grooved joining face and the stamped edge region ensures a strong and fluid-leakproof connection between the edge region and the joining face, such that the danger of tearing off of the membrane from the base is prevented and also the danger of the penetration of filling fluid between the joining face and the stamped edge region of the membrane is prevented. In the stamping of the wave troughs and crests of the edge region of the membrane, the grooved joining face serves as the die, such that the grooves of the joining face and the waves of the edge region of the membrane actually are formed to complement each other. Thus it is possible to prevent the crests of the grooved joining face and the wave crests of the edge region of the membrane from being partially offset relative to each other in the radial direction of the membrane, which would result in a non-uniform support of the wave crests of the edge region of the membrane by the crests of the joining face. Such a non-uniform support would have the consequence that the annular protrusions formed by the wave crests would deviate from their desired shape, which would, in turn, reduce the sealing action of the protrusions.

According to a second aspect of the invention, the process for production of an assembly of a membrane pressure sensor comprises the steps, a) that by means of a stamping tool, the edge region of a membrane blank is plastically deformed such that the wave troughs and wave crests of the edge region are stamped by this, b) that the joining face on the base is formed as an essentially flat surface, c) that a solder paste is applied to the entire flat joining face, d) that the membrane with its stamped edge region is placed on the joining face provided with the solder paste, and e) that the stamped edge region is soldered to the flat joining face through the application of heat.

In this case, again, the full-surface solder between the joining face and the stamped edge region ensures a strong and fluid-leakproof connection between the edge region of the membrane and the joining face. Since the joining face is designed flat and none of the wave crests of the stamped edge region of the membrane has supporting crests, there can be no misalignment of the wave crests relative to the joining face such that high shape accuracy of the annular protrusions of the edge region of the membrane formed by the wave crests is ensured.

According to another aspect of the invention, the process for production of an assembly of a membrane pressure sensor comprises the steps, a) that the joining face on the base is designed as a grooved surface with a large number of grooves concentric to each other, which are directly adjacent to each other, such that the transition between two adjacent grooves is formed by a crest, b) that a membrane blank with a flat edge region is produced, c) that a solder paste is applied on the crests of the grooved joining face, d) that the membrane blank is placed with its flat edge region on the joining face provided with solder paste, e) that the flat edge region of the membrane blank is soldered to the crests of the grooved joining face through the application of heat, while the base is disposed above the membrane blank, and f) that, next, the edge region of the membrane blank already soldered to the crests of the joining face is pressed against the grooved joining face by means of a tool such that the sections of the edge region of the membrane blank lying between the crests are plastically deformed and thus the wave troughs of the edge region of the membrane are stamped with a shape complementary to the grooves of the joining face.

Through the soldering of the edge region of the membrane to the numerous crests of the grooved joining face, a particularly strong and fluid-leakproof connection between the stamped edge region of the membrane and the joining face is obtained. Since the edge region of the membrane is not stamped until after the crests of the joining face have been soldered to the edge region of the membrane, misalignment between the wave crests of the stamped membrane and the crests of the joining face is prevented with high reliability.

The membrane pressure sensor according to the invention comprises an assembly which consists of a thin membrane made of metal as well as a base made of metal. The membrane has a waved central region and an annular edge region surrounding the central region. The base has, on its side facing the central region of the membrane, a shallow recess with a bottom which has a waved surface complementary to the waves of the central region of the membrane and which forms a membrane bed for the membrane. The base also has, surrounding the recess, an annular joining face onto which the edge region of the membrane is attached. The edge region of the membrane is waved such that a large number of annular wave troughs and crests succeed one another alternatingly in the radial direction of the membrane, such that the wave crests form annular protrusions on the side of the edge region turned away from the joining face. To this extent, the membrane pressure sensor according to the invention matches the prior art membrane pressure sensor described in the introduction.

According to one aspect of the invention, in the membrane pressure sensor with the characteristics presented above, provision is also made that the joining face is formed on the base as a grooved surface with a large number of grooves concentric to each other, which are directly adjacent to each other such that the transition between two adjacent grooves is formed by a crest, that the grooves and crests of the joining face are shaped complementary to the wave troughs and crests of the edge region of the membrane and that at least all wave crests of the edge region of the membrane are each circumferentially welded to one of crests of the joining face. Through the circumferential welding of at least all wave crests of the edge region to one each of the crests of the joining face, a strong and fluid-leakproof connection between the stamped edge region of the membrane and the joining face is ensured.

According to another aspect of the invention, alternatively to the above-described aspect of the invention, provision is made in the membrane pressure sensor that the joining face on the base is formed as an essentially flat surface and that at least all of the wave troughs of the edge region of the membrane are welded circumferentially with the flat joining face. Since at least all wave troughs of the edge region are circumferentially welded with the flat joining face, a strong and fluid-leakproof connection between the stamped edge region of the membrane and the joining face is ensured. Since the joining face on the base is essentially flat, the support of the stamped edge region of the membrane on the joining face of the base cannot lead to a deviation of the protrusions formed by the wave crests of the stamped edge region from their desired shape, such that effective sealing of the measurement substance space is ensured.

Figure 2:
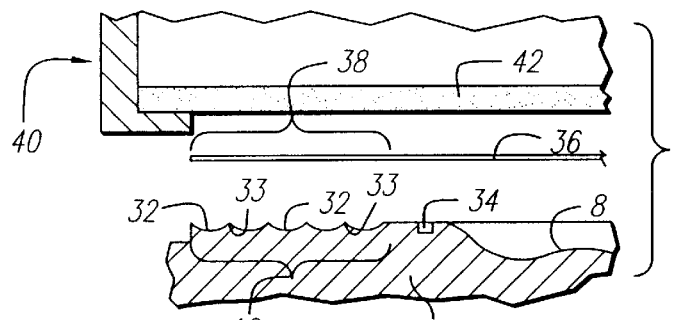
Figure 3:
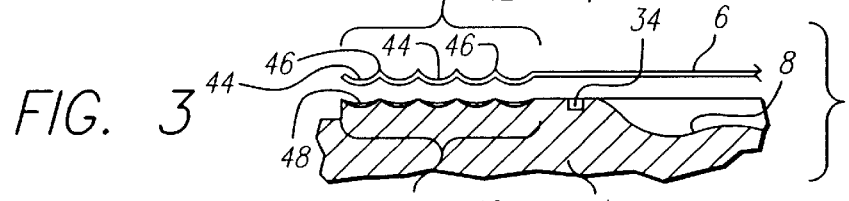
Figure 4:
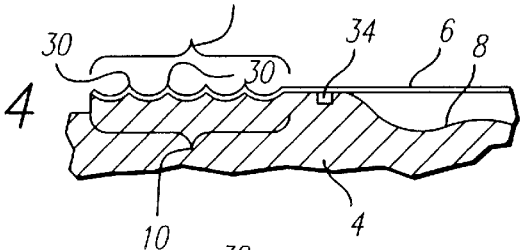
Figure 5:
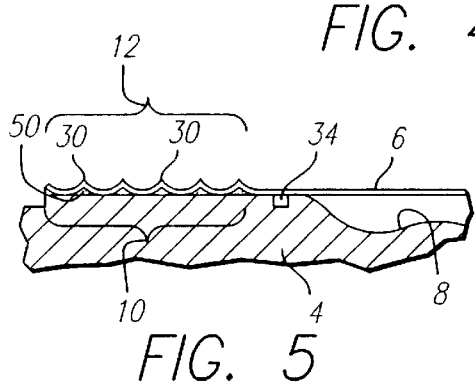
Figure 6:
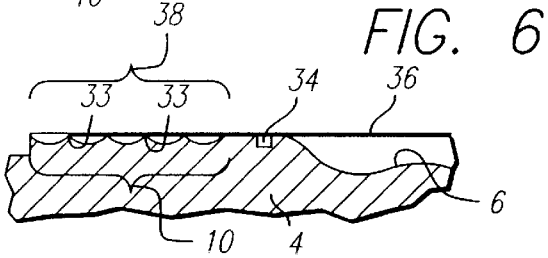

Advantageous improvements of the invention are characterized in the dependent claims and are revealed in the following description of exemplary embodiments of the invention, which are depicted in FIG. 1 through 6. They depict:

FIG. 1 a section through an exemplary embodiment of a membrane pressure sensor according to the invention;

FIGS. 2 through 4 a schematic layout to explain individual steps of a process for production of an assembly of the membrane pressure sensor according to FIG. 1;

FIG. 5 a schematic layout to explain a second embodiment of the process according to the invention and a second embodiment of the membrane pressure sensor according to the invention; and FIG. 6 a schematic layout to explain a third embodiment of the process according to the invention and a third embodiment of the membrane pressure sensor according to the invention.

A membrane pressure sensor 2 schematically depicted in FIG. 1 comprises an assembly, which consists of an essentially circular disk-shaped base 4 and a thin, waved membrane 6 with a circular outline.

The base 4 is produced from a metallic material, for example, from an austenitic steel. On its lower side in FIG. 1, the base 4 has a centrally disposed shallow recess, whose bottom 8 has a waved surface and forms a membrane bed. The waves of the bottom 8 consist of annular wave crests and annular wave troughs, all of which are disposed and designed concentric to each other.

The base 4 also has, surrounding the recess, an annular joining face 10, the design of which is explained in greater detail in the following. An annular edge region 12 of the membrane 6 (see FIG. 3) is welded to the joining face 10. Radially inside the annular edge region 12 of the membrane 6, the membrane has a central region which covers the recess in the base 4 and is waved in a manner complementary to the waves of the bottom 8. This waved central region of the membrane bounds, together with the walls of the recess, a shallow pressure sensing space 14, which is connected via a central bore 16 in the base with a line 18, onto which a pressure gage (not shown), for example, a bourdon tube pressure gage is connected.

Using bolts 20, a flange made of a metallic material, of an austenitic steel, for example, is attached to the base 4. A measurement material space 24, which is separated from the pressure sensing space 14 by the membrane 6, is formed centrally in the flange 22. An annular, flat, opposing sealing face 26 which surrounds the measurement material space 24 and which is turned toward the joining face 10 and the edge region 12 of the membrane 6 is formed on the flange 22. A thin sealing ring 28 is disposed between the opposing sealing face 26 and the edge region 12 of the membrane. The bolts 20 tighten the base 4 against the flange 22 such that the sealing ring 28 is clamped between the opposing sealing face 26 and the edge region 12 of the membrane, and thus the measurement material space 24 is sealed against the outside. This provides for a particularly high sealing action in that the edge region 12 of the membrane 6 turned toward the opposing sealing face 26 has annular protrusions 30 (see FIG. 4), which are explained in greater detail in the following.

In operation, the pressure sensing space 14, the bore 16, the line 18, and the measurement element (not shown) of the pressure gage are filled with a suitable filing fluid. Also, in operation the measurement material space 24 is filled with the measurement material, whose pressure is to be measured. The pressure of the measurement material in the measurement material space 24 is transmitted via the membrane 6 to the filling fluid in the pressure sensing space 14 such that the pressure gage (not shown), which measures and displays the pressure of the filling fluid, thus also displays the pressure of the measurement material in the measurement material space 24.

In the exemplary embodiment of a membrane pressure sensor depicted in FIG. 1, the flange is an element of the line system carrying the measurement material. The membrane pressure sensor is in this case formed by the line 8 as well as the assembly composed of the base 4 and the membrane 6. Alternatively to the embodiment depicted, the flange 22 may be a component of the membrane pressure sensor, whereby the flange 22 is then provided with an inside thread or an outside thread, by means of which it may be attached to the system carrying the material to be measured.

To explain the process for production of the assembly from the base 4 and the membrane 6, the detail X from FIG. 1 is depicted in enlargement in FIG. 4, whereby, however, the sealing ring 28 and the flange 22 are omitted and—in deviation from FIG. 1 —the base 4 is depicted on the bottom and the membrane 6 on the top. In a depiction similar to FIG. 4, FIGS. 2 and 3 explain steps executed during the process for production of the assembly.

In the process of production of the assembly from the base 4 and the membrane 6, a large number of grooves 32 concentric to each other is first formed on the base 4 by machining. The grooves 32 are directly adjacent to each other such that the transition between two adjacent grooves is formed in each case by a crest 33. The totality of the surfaces of the grooves 32 yields the joining face 10 of the base 4.

As FIG. 2 shows, in the exemplary embodiment depicted, each of the grooves 32 has an annular outline. The radius of the arc is preferably in the range from 0.2 to 0.8 mm and has, in a preferred exemplary embodiment, a value of 0.4 mm. The depth of the grooves, i.e., the distance between the highest point of a crest 33 and the lowest point of the bottom of a groove 32 measured perpendicular to the plane of the joining face 10, is preferably in the range from 0.1 mm to 0.6 mm and has, in a preferred exemplary embodiment, the value 0.19 mm. The width of each groove, i.e., the distance between adjacent crests 33, is preferably in the range between 0.5 mm and 1.5 mm and has, in a preferred exemplary embodiment, the value 0.71 mm. As seen from the above data, the grooves 32 have comparatively small dimensions, such that together they yield a fine grooving. To be able to depict the grooves 32 in a drawing at all, they are depicted in both FIG. 1 and in FIGS. 2 through 4 with dimensions which are disproportionately large compared to the other dimensions of the membrane pressure sensor depicted. The same is true for the number of grooves 32. In FIGS. 2 through 4, for reasons of graphic representation, only five grooves are shown. Usually the number of grooves is significantly higher. In a preferred exemplary embodiment, 26 grooves 32 are provided.

Radially inside the grooves 32 and also radially outside the recess of the base 4, a circumferential groove 34 is formed in the base.

In the process of production of the membrane 6, a thin annular membrane blank 36 is first produced (see FIG. 2). This is usually done by stamping the membrane blank 36 from a metal sheet. The material of the membrane blank 36 is adapted to the intended use of the membrane pressure sensor. Materials used for the membrane blank 36 and thus for the membrane 6 are, for example, chromium-nickel steel, titanium, Hastelloy (nickel—molybdenum—iron alloy with over 55% nickel), Monel (nickel—copper alloy with 30 to 40% copper), Inconel (heat-resistant nickel based alloy), or tantalum.

After the grooves 32 have been formed on the base 4, the thin membrane blank 36 is placed on top of the base 4 such that the edge region 38 of the membrane blank 36 precisely covers the joining face 10. A tool 40, which is used to press the edge region 38 of the membrane blank 36 against the base 10, is then placed on top of this arrangement of the membrane blank 36 and the base 4. FIG. 2 depicts the arrangement of the base 4 with the grooved joining face 10, the membrane blank 36, and the tool 40, whereby, however, in FIG. 2 the elements of this arrangement are still depicted with a certain distance between them.

The tool 40, which is only schematically depicted in FIG. 2, has a disk 42 made of an elastic rubber material. The surface of the disk 42 facing the membrane blank 36 is flat To plastically shape the edge region 38 of the membrane blank 36, a hydraulic fluid on the side of the disk 42 turned away from the membrane blank 36 is pressurized. This presses the disk 42 against the edge region 38 of the membrane blank 36, whereby the edge region 38 is in turn pressed against the grooved joining face 10. The result is that the disk 42 presses the edge region 38 of the membrane blank 36 into the grooves 32 and is plastically deformed such that through this stamping process the edge region 38 of the membrane blank 36 is shaped to the stamped edge region 12 of the membrane 6.

The edge region 12 thus stamped is waved and consists of a large number of annular wave troughs 44 and wave crests 46 (see FIG. 3). Since the wave troughs 44 and the wave crests 46 are shaped using the grooved joining face 10 as a die, the waves of the edge region 12 are complementary with great accuracy to the grooving of the joining face 10. In the exemplary embodiment depicted, this means that the number of wave troughs 44 equals the number of grooves 32, that each wave trough 44 has an arcuate profile, that the arcuate profiles of adjacent wave troughs directly abut each other and that the wave crests 46 between adjacent wave troughs are formed in each case by an annular ridge, which was shaped by one of the crests 33.

After the edge region 12 of the membrane 6 has been stamped in the above-described manner, the membrane 6 is lifted off the base 4 so that a solder paste 48, usually made of solder and a flux, can be applied to the entire grooved joining face 10 (see FIG. 3).

Following the application of the solder paste, the membrane 6 with the stamped edge region 12 is replaced on the base 4 and soldered with the base 4 in the region of the joining face 10 through the application of heat. This takes place preferably in a furnace, whereby during the soldering in the furnace, the edge region 12 of the membrane 6 is stressed by a weight (not shown) to press the edge region 12 against the joining face 10 during soldering. The groove 34 catches fluid solder which possibly migrates radially inward between the base 4 and the membrane 6 during soldering.

After soldering, the arrangement depicted in FIG. 4 is obtained. The entire waved edge region 12 of the membrane 6 is attached with its full surface to the grooved joining face 10. This full-surface attachment ensures high mechanical strength and leakproofness, such that in operation no filling fluid can creep between the membrane and the base. If it should prove necessary, after a certain period of operation, to separate the assembly comprising the base 4 and the membrane 6 from the flange 22, the high mechanical strength of the attachment prevents a tearing off of the membrane 6 from the base 4 even if the membrane 6 adheres strongly to the sealing ring 28.

The ridge-shaped wave crests 46 of the waved edge region 12 form the protrusions 30, which provide for the particularly good sealing at the sealing ring 28 or at the opposing sealing face 26 in the assembled state of the membrane pressure sensor (see FIG. 1).

Based on the above-described production process, it is ensured that each protrusion 30 is precisely supported uniformly over the entire circumference by a crest 33 of the grooved joining face 10, such that deviations of the protrusions 30 from their desired shape is prevented. This is also true if the shape or the profile of the wave troughs 44 should deviate slightly from the shape or profile of the grooves 32. Even if there is a small distance between the surfaces of the grooves 32 on the one hand and the wave troughs 44 of the edge region 12, it is nevertheless ensured that the ridge-shaped wave crests 46 of the edge region 12 sit precisely on the crests 34.

In a depiction similar to FIG. 4, FIG. 5 shows details of a second exemplary embodiment of the membrane pressure sensor according to the invention. This second embodiment differs from the first in that the joining face 10 is not grooved, but is essentially flat. The waved edge region 12 of the membrane 6 has the same form as the waved edge region 12 of the membrane 6 in the first embodiment. All intermediate spaces between the waved edge region 12 of the membrane 6 and the flat joining face 10 are filled with solder 50 such that the entire edge region 12 of the membrane 6 is soldered to the joining face 10 with its full surface. Alternatively, and in deviation from the depiction in FIG. 5, provision may be made that only all wave troughs of the edge region 12 are soldered to the joining face 10. With respect to all other characteristics, the membrane pressure sensor according to the second embodiment matches that according to the first embodiment. Since, in the second embodiment, at least all of the wave troughs are soldered to the joining face, the connection between the edge region 12 of the membrane 6 and the joining face 10 is mechanically strong and leakproof, which yields the same favorable characteristics as explained above in conjunction with the first embodiment. Since the joining face 10 of the second embodiment has no crests 33 supporting the protrusions 30, there can be no deformation of the protrusions 30 by such crests. Consequently, the annular protrusions 30 always have a high accuracy of shape, with the result that their sealing action meet very high requirements.

In the process of production of the membrane pressure sensor according to the second embodiment, the essentially flat joining face 10 is formed on the base 4. A thin membrane blank 36 is produced in the same manner as in the first embodiment of the process. Using a stamping tool with a die and a stamp, the edge region 38 of the membrane blank 36 is plastically shaped such that the wave troughs and wave crests of the edge region 12 of the membrane are stamped. After a solder paste has been applied to the entire flat joining face 10, the membrane 6 is placed with its stamped edge region 12 on the joining face 10 provided with solder paste and the edge region 12 and the joining face 10 are soldered together with the application of heat. This soldering process may be performed in the same manner as explained above in conjunction with the first embodiment of the process.

In the following, a third embodiment of the process for production of an assembly comprising the base 4 and the membrane 6 as well as a third embodiment of the membrane pressure sensor are explained with reference to FIG. 6. According to this third embodiment, first a grooved joining face 10 is formed on the base 4 in the same manner as in the first embodiment of the process. Also, in the same manner as in the first embodiment of the process, a thin membrane blank 36 is prepared. After that, a solder paste is applied to all crests 33. Then, the membrane blank is set with its still flat edge region 36 on top of the joining face 10, after which the edge region 38 of the membrane blank 36 is soldered to the joining face 10 along the crests 33. The arrangement comprising the membrane blank 36 and base 34 [?sic ?4] is disposed in the furnace such that the base 4 is disposed above the membrane blank 36, which is pressed from below against the base 4. The purpose for this is that during soldering the solder remains in the region of the crests 33 and does not flow into the grooves.

After the soldering process, the arrangement according to FIG. 6 is obtained. The edge region 38 is soldered along all crests 33 to the joining face 10 which is still flat. Following the soldering process, the edge region 38 of the membrane blank 36 is pressed using a tool against the grooved joining face 10 such that the sections of the edge region 38 lying between the crests 33 are plastically shaped and thus the wave troughs of the edge region of the membrane are stamped with a shape complementary to the grooves of the joining face 10. This stamping process may be performed using the tool 40 explained with reference to FIG. 2 and in the same manner as in the first embodiment of the process.

After the stamping, there is an assembly comprising the base 4 and membrane 6, which has the form depicted in FIG. 4, but differs from the assembly of the first embodiment of the membrane pressure sensor in that the grooved joining face 10 and the waved edge region 12 are not soldered together over their full surface, but merely along all crests 33. The soldering along all crests 33 yields a strong and fluid-leakproof connection between the membrane 6 and the base 4. Since in the third embodiment of the process, the edge region 12 of the membrane 6 is not stamped until after the crests 33 of the joining face 10 have already been soldered with edge region 38 of the membrane blank 36, any error in the alignment between the crests 33 and the protrusions 30 is ruled out such that the protrusions 30 have the highest possible accuracy of shape.

In conjunction with the above explanation of the three embodiments of the process according to the invention, no mention of when and how the waved central region of the membrane 6 is stamped was made. The stamping of this central region may take place on the membrane blank before stamping its edge region or simultaneously with the stamping of its edge region or not until after the soldering of the joining face 10 with the edge region 12 of the membrane 6.

The invention is not restricted to the above-described exemplary embodiments. Rather, numerous variations of the process according to the invention and of the membrane pressure sensor are possible within the framework of the above disclosure.

A membrane pressure sensor has an assembly comprising a thin membrane and a base, on which an annular joining face is formed. The membrane has a waved edge region in which numerous annular wave troughs and wave crests succeed one another alternatingly in the radial direction. The waved edge region of the membrane is attached to the joining face of the base. The wave crests of the edge region form numerous annular protrusions on the side turned away from the joining face, which permit a high sealing action when the assembly is connected with an annular flange having a measurement material space. When the joining face is flat, at least all wave troughs of the waved edge region of the membrane are circumferentially soldered to the joining face. When the joining face is provided with grooves complementary to the waves of the edge region, at least all wave crests of the waved edge region are soldered to the joining face and the waves of the edge region are stamped by pressing the initially flat edge region of a membrane blank against the grooved joining face such that this serves as a die during the stamping process.

I claim:

1. A process for production of an assembly of a membrane pressure sensor, which consists of a thin membrane of metal as well as a base of metal, whereby the membrane has a waved central region and an annular edge region surrounding the central region, whereby the base has, on its side facing the membrane, a shallow recess with a bottom, which has a waved surface complementary to the waves of the central region of the membrane and forms a membrane bed for the membrane, whereby the base has an annular joining face surrounding the recess onto which the edge region of the membrane is attached, and whereby the edge region of the membrane is waved such that a large number of annular wave troughs and wave crests succeed each other alternatingly in the radial direction of the membrane such that the wave crests form annular protrusions on the side of the edge region turned away from the joining face, whereby the process includes the steps, a) that the joining face on the base is formed as a grooved surface with a large number of grooves concentric to each other, which grooves are directly adjacent to each other, such that the transition between two adjacent grooves is formed by a crest, b) that a membrane blank with a flat edge region is produced, c) that the flat edge region of the membrane blank is placed on the grooved joining face and pressure is applied by a tool such that the edge region of the membrane blank is plastically deformed and thus the wave troughs and crests of the edge region of the membrane are stamped with a shape complementary to the grooves and crests of the joining face, d) that, next, the membrane is separated from the base, e) that a solder paste is applied to the entire grooved joining face, f) that the membrane with its stamped edge region is placed on the joining face provided with the solder paste, and g) that the stamped edge region is soldered to the grooved joining face through the application of heat.

2. The process according to claim 1, whereby the tool used in step c) has a disk made of an elastic rubber material, which is pressed on the grooved joining face against the edge region of the membrane blank to stamp the edge region of the membrane, and whereby the surface of the disk which comes into contract with the edge region of the membrane blank is flat.

3. The process according to claim 2, whereby a hydraulic fluid under pressure acts on the side of the disk turned away from the membrane blank, which hydraulic fluid presses the disk against the edge region of the membrane blank.

4. The process according to one of claims 1 through 3, whereby step g) is performed in a furnace.

5. The process according to claim 4, whereby in step g) the stamped edge region of the membrane is pressed in the direction toward the joining face by means of a weight placed on the membrane.

6. A process for production of an assembly of a membrane pressure sensor, which consists of a thin membrane of metal as well as a base of metal, whereby the membrane has a waved central region and an annular edge region surrounding the central region, whereby the base has, on its side facing the membrane, a shallow recess with a bottom, which has a waved surface complementary to the waves of the central region of the membrane and forms a membrane bed for the membrane, whereby the base has an annular joining face surrounding the recess onto which the edge region of the membrane is attached, and whereby the edge region of the membrane is waved such that a large number of annular wave troughs and wave crests succeed each other alternatingly in the radial direction of the membrane such that the wave crests form annular protrusions on the side of the edge region turned away from the joining face, whereby the process includes the steps, a) that by means of a stamping tool, the edge region of a membrane blank is plastically deformed such that the wave troughs and wave crests of the edge region are stamped by this, b) that the joining face on the base is formed as an essentially flat surface, c) that a solder paste is applied to the entire flat joining face, d) that the membrane with its stamped edge region is placed on the joining face provided with the solder paste, and e) that the stamped edge region is soldered to the flat joining face through the application of heat.

7. The process according to claim 6, whereby step e) is performed in a furnace.

8. The process according to claim 7, whereby in step e) the stamped edge region of the membrane is pressed in the direction toward the joining face by means of a weight placed on the membrane.

9. A process for production of an assembly of a membrane pressure sensor, which consists of a thin membrane of metal as well as a base of metal, whereby the membrane has a waved central region and an annular edge region surrounding the central region, whereby the base has, on its side facing the membrane, a shallow recess with a bottom, which has a waved surface complementary to the waves of the central region of the membrane and forms a membrane bed for the membrane, whereby the base has an annular joining face surrounding the recess, onto which the edge region of the membrane is attached, and whereby the edge region of the membrane is waved such that a large number of annular wave troughs and wave crests succeed each other alternatingly in the radial direction of the membrane such that the wave crests form annular protrusions on the side of the edge region turned away from the joining face, whereby the process includes the steps, a) that the joining face on the base is designed as a grooved surface with a large number of grooves concentric to each other, which are directly adjacent to each other, such that the transition between two adjacent grooves is formed by a crest, b) that a membrane blank with a flat edge region is produced, c) that a solder paste is applied on the crests of the grooved joining face, d) that the membrane blank is placed with its flat edge region on the joining face provided with solder paste, e) that the flat edge region of the membrane blank is soldered to the crests of the grooved joining face through the application of heat, while the base is disposed above the membrane blank, and f) that, next, the edge region of the membrane blank already soldered to the crests of the joining face is pressed against the grooved joining face by means of a tool such that the sections of the edge region of the membrane blank lying between the crests are plastically deformed and thus the wave troughs of the edge region of the membrane are stamped with a shape complementary to the grooves of the joining face.

10. The process according to claim 9, whereby the tool used in step f) has a disk made of an elastic rubber material, which is pressed on the grooved joining face against the edge region of the membrane blank to stamp the edge region of the membrane, and whereby the surface of the disk which comes into contract with the edge region of the membrane blank is flat.

11. The process according to claim 10, whereby a hydraulic fluid under pressure acts on the side of the disk turned away from the membrane blank, which hydraulic fluid presses the disk against the edge region of the membrane blank.

12. A membrane pressure sensor with an assembly which comprises a thin membrane made of metal as well as a base made of metal, whereby the membrane has a waved central region and an annular edge region surrounding the central region, whereby the base has, on its side facing the membrane, a shallow recess with a bottom, which has a waved surface complementary to the waves of the central region of the membrane and forms a membrane bed for the membrane, whereby the base has an annular joining face surrounding the recess, onto which the edge region of the membrane is attached, whereby the edge region of the membrane is waved such that a large number of annular wave troughs and wave crests succeed each other alternatingly in the radial direction of the membrane such that the wave crests form annular protrusions on the side of the edge region turned away from the joining face, whereby the joining face on the base is designed as a grooved surface with a large number of grooves concentric to each other, which are directly adjacent to each other, such that the transition between two adjacent grooves is formed by a crest, whereby the grooves and crests of the joining face are shaped complementary to the wave troughs and wave crests of the edge region of the membrane, and whereby at least all wave crests of the edge region are each circumferentially soldered to one of the crests of the joining face.

13. The membrane pressure sensor according to claim 12, whereby all wave troughs and wave crests of the edge region of the membrane are soldered with its full surface to the joining face.

14. The membrane pressure sensor according to claim 12 or 13, whereby the number of wave troughs of the edge region of the membrane is equal to the number of grooves of the joining face.

15. The membrane pressure sensor according to one of claims 12 through 14, whereby radially inside the grooves and radially outside the recess of the base, a circumferential groove is formed in the base.

16. The membrane pressure sensor according to one of claims 12 through 15, whereby each of the grooves has a depth in the range between 0.1 mm and 0.6 mm and a width in the range between 0.5 mm and 1.5 mm.

17. The membrane pressure sensor according to claim 16, whereby each of the grooves has an arcuate profile.

18. The membrane pressure sensor according to claim 17, whereby the radius of the arcuate profile is in the range between 0.2 mm and 0.8 mm.

19. The membrane pressure sensor according to one of claims 12 through 18, whereby the base is made of an austenitic steel.

20. The membrane pressure sensor according to one of claims 12 through 19, whereby the material of the membrane is titanium, Hastelloy, Monel, nickel, Inconel, or tantalum.

21. A membrane pressure sensor with an assembly which comprises a thin membrane made of metal as well as a base made of metal, whereby the membrane has a waved central region and an annular edge region surrounding the central region, whereby the base has, on its side facing the membrane, a shallow recess with a bottom, which has a waved surface complementary to the waves of the central region of the membrane and forms a membrane bed for the membrane, whereby the base has an annular joining face surrounding the recess onto which the edge region of the membrane is attached, whereby the edge region of the membrane is waved such that a large number of annular wave troughs and wave crests succeed each other alternatingly in the radial direction of the membrane such that the wave crests form annular protrusions on the side of the edge region turned away from the joining face, whereby the joining face on the base is designed as an essentially flat surface, and whereby at least all wave troughs of the edge region of the membrane are circumferentially soldered to the flat joining face.

22. The membrane pressure sensor according to claim 21, characterized in that all intermediate spaces between the waved edge region of the membrane and the flat joining face are filled with solder such that the edge region of the membrane is soldered to the joining face with its full surface.

23. The membrane pressure sensor according to claim 21 or 22, whereby radially inside the wave troughs of the edge region and radially outside the recess of the base, a circumferential groove is formed in the base.

24. The membrane pressure sensor according to one of claims 21 through 23, whereby each wave trough of the edge region of the membrane has a depth in the range between 0.1 mm and 0.6 mm and whereby the distance between adjacent wave crests of the edge region of the membrane is in the range between 0.5 mm and 1.5 mm.

25. The membrane pressure sensor according to claim 24, whereby each wave trough of the edge region of the membrane has an arcuate profile and whereby the arcuate profiles of adjacent wave troughs directly abut each other such that the wave crest between adjacent wave troughs is formed by an annular ridge.

26. The membrane pressure sensor according to claim 25, whereby the radius of the arcuate profile is in the range between 0.2 mm and 0.8 mm.

27. The membrane pressure sensor according to one of claims 21 through 26, whereby the base is made of an austenitic steel.

28. The membrane pressure sensor according to one of claims 21 through 27, whereby the material of the membrane is titanium, Hastelloy, Monel, nickel, Inconel, or tantalum.

* * * * *